United States Patent
Hoke (10) Patent No.: US 8,789,374 B2
(45) Date of Patent: *Jul. 29, 2014

(54) GAS TURBINE COMBUSTOR WITH LINER AIR ADMISSION HOLES ASSOCIATED WITH INTERPERSED MAIN AND PILOT SWIRLER ASSEMBLIES

(71) Applicant: United Technologies Corporation, Hartford, CT (US)

(72) Inventor: James B. Hoke, Tolland, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/761,454

(22) Filed: Feb. 7, 2013

(65) Prior Publication Data

US 2013/0186099 A1 Jul. 25, 2013

Related U.S. Application Data

(62) Division of application No. 13/012,254, filed on Jan. 24, 2011, now Pat. No. 8,479,521.

(51) Int. Cl.
*F02C 1/00* (2006.01)
*F02G 3/00* (2006.01)

(52) U.S. Cl.
USPC .............. 60/754; 60/756; 60/748; 60/746

(58) Field of Classification Search
USPC ............ 60/746, 747, 748, 737, 754, 804, 756
See application file for complete search history.

(56) References Cited

U.S. PATENT DOCUMENTS

| 818,634 A | 8/1959 | Betteridge et al. |
| 4,817,389 A | 4/1989 | Holladay et al. |
| 5,081,844 A * | 1/1992 | Keller et al. ................ 60/737 |
| 7,506,511 B2 * | 3/2009 | Zupanc et al. ............... 60/746 |

FOREIGN PATENT DOCUMENTS

| DE | 44123156 | 10/1995 |
| DE | 19631616 | 2/1998 |
| EP | 0802310 A2 | 10/1997 |
| EP | 1515090 A1 | 3/2005 |
| EP | 1522792 A1 | 4/2005 |
| EP | 1775516 A2 | 4/2007 |

(Continued)

OTHER PUBLICATIONS

International Search Report for related European Application No. 12151284.2; report dated Mar. 26, 2012.

*Primary Examiner* — William H Rodriguez
*Assistant Examiner* — Carlos A Rivera
(74) *Attorney, Agent, or Firm* — Miller, Matthias & Hull LLP (57) ABSTRACT

A combustor for a gas turbine engine having an annular combustion chamber includes a plurality of main fuel injection and air swirler assemblies and a plurality of pilot fuel injection and air swirler assemblies disposed in a circumferential ring extending about the circumferential expanse of a forward bulkhead. The plurality of pilot fuel injection and air swirler assemblies are interspersed amongst and disposed in the circumferential ring of main fuel injection and air swirler assemblies. Fuel being supplied to the combustor is selectively distributed between the plurality of main fuel injection and air swirler assemblies and the plurality of pilot fuel injection and air swirler assemblies in response to the level of power demand on the gas turbine engine.

6 Claims, 5 Drawing Sheets

(56) References Cited

FOREIGN PATENT DOCUMENTS

| | | | |
|---|---|---|---|
| EP | 0544350 | A1 | 2/2013 |
| FR | 2694799 | A1 | 2/1994 |
| GB | 2278431 | A | 11/1994 |
| GB | 2384046 | A | 7/2003 |
| GB | 2390890 | A | 1/2004 |
| JP | 4139312 | A | 5/1992 |
| WO | WO-2008/127437 | A2 | 10/2008 |

\* cited by examiner

GAS TURBINE COMBUSTOR WITH LINER AIR ADMISSION HOLES ASSOCIATED WITH INTERPERSED MAIN AND PILOT SWIRLER ASSEMBLIES

CROSS-REFERENCE TO RELATED APPLICATIONS

This is a continuation under 35 U.S.C. §120 of U.S. patent application Ser. No. 13/012,254 filed on Jan. 24, 2011. This application is also related to co-pending U.S. patent application Ser. No. 11/294,951, filed Dec. 6, 2005, entitled "Gas Turbine Combustor", published Jun. 7, 2007, as U.S. Patent Application Publication No. 2007-0125093 A1, and subject to assignment to the common assignee to which this application is subject to assignment. This application is also related to co-pending U.S. patent application Ser. No. 12/625,750, filed Nov. 25, 2009, entitled "Gas Turbine Combustor", and subject to assignment to the common assignee to which this application is subject to assignment.

FIELD OF THE INVENTION

This invention relates generally to gas turbine engines and, more particularly, to a combustor for a gas turbine engine and a method for operating a combustor of a gas turbine engine.

BACKGROUND OF THE INVENTION

Gas turbine engines, such as those used to power modern aircraft or in industrial applications, include a compressor for pressurizing a supply of air, a combustor for burning a hydrocarbon fuel in the presence of the pressurized air, and a turbine for extracting energy from the resultant combustion gases. Generally, the compressor, combustor and turbine are disposed about a central engine axis with the compressor disposed axially upstream of the combustor and the turbine disposed axially downstream of the combustor.

An exemplary combustor features an annular combustion chamber defined between a radially inboard liner and a radially outboard liner extending aft from a forward bulkhead. The radially outboard liner extends circumferentially about and is radially spaced from the inboard liner, with the combustion chamber extending fore to aft therebetween. Exemplary liners are double-wall structured, having an inner heat shield and an outer support shell. Combustion air admission holes penetrate the outboard liner and the inboard liner to admit combustion air into the combustion chamber along the length of the combustion chamber. A plurality of circumferentially distributed fuel injectors and associated swirlers or air passages is mounted in the forward bulkhead. The fuel injectors project into the forward end of the combustion chamber to supply the fuel. The swirlers impart a swirl to inlet air entering the forward end of the combustion chamber at the bulkhead to provide rapid mixing of the fuel and inlet air. Commonly assigned U.S. Pat. Nos. 6,240,731; 6,606,861; 6,810,673 and 7,093,441, the entire disclosures of which are hereby incorporated herein by reference as if set forth herein, disclose exemplary prior art annular combustors for gas turbine engines.

Combustion of the hydrocarbon fuel in air inevitably produces oxides of nitrogen (NOx). NOx emissions are the subject of increasingly stringent controls by regulatory authorities. One combustion strategy for minimizing NOx emissions from gas turbine engines is referred to as rich burn, quick quench, lean burn (RQL) combustion. The RQL combustion strategy recognizes that the conditions for NOx formation are most favorable at elevated combustion flame temperatures, i.e. when the fuel-air ratio is at or near stoichiometric. The combustion process in a combustor configured for RQL combustion has two governing states of combustion: a first state in the forward portion of the combustor that is stoichiometrically fuel-rich and a second state in a downstream portion of the combustor that is stoichiometrically fuel-lean.

Conventional annual combustors for aircraft gas turbine engines employing the RQL combustion process typically are more effective in reducing NOx emissions during high power engine operating conditions, such as experienced during takeoff and climb, and during low power engine operating conditions, such as experienced during approach and idle, than during moderate power engine operating conditions such as experienced at cruise. Accordingly, a desire exists for a gas turbine combustor that exhibits effective NOx emission reduction performance over the entire range of engine operating conditions, including cruise.

SUMMARY OF THE INVENTION

In an aspect, a combustor for a gas turbine engine having an annular combustion chamber, includes a bulkhead disposed at a forward end of the annular combustion chamber, a plurality of main fuel injection and air swirler assemblies opening through the bulkhead for admitting fuel and air into the annular combustion chamber, and a plurality of pilot fuel injection and air swirler assemblies opening through the bulkhead for admitting fuel and air into the annular combustion chamber. The plurality of main fuel injection and air swirler assemblies are disposed in a circumferential ring extending about the circumferential expanse of the bulkhead. The plurality of pilot fuel injection and air swirler assemblies are interspersed amongst and disposed in the circumferential ring of main fuel injection and air swirler assemblies. The air swirlers of the plurality of main fuel injection and air swirler assemblies are adapted to impart a lower level of swirl to air passing therethrough relative the air swirlers of the plurality of pilot fuel injection and air swirler assemblies. In an embodiment of the combustor, the plurality of main fuel injection and air swirler assemblies and the plurality of pilot fuel injection and air swirler assemblies are disposed in alternating sequence in the circumferential ring of the plurality of main fuel injection and air swirler assemblies and the plurality of pilot fuel injection and air swirler assemblies.

In an embodiment, the combustor further includes an inboard liner extending longitudinally fore to aft from a radially inboard extent of the circumferential expanse of the bulkhead to a combustor exit, an outboard liner extending longitudinally fore to aft from a radially outboard extent of the circumferential expanse of the bulkhead to the combustor exit, a first plurality of relatively larger combustion air admission holes formed in at least the outboard liner and arranged in a circumferential ring aftward of the bulkhead in association with the plurality of main fuel injection and air swirler assemblies, and a first plurality of relatively smaller combustion air admission holes formed in at least the outboard liner and arranged in a circumferential ring aftward of the bulkhead in association with the plurality of pilot fuel injection and air swirler assemblies. The first plurality of relatively larger combustion air admission holes and the first plurality of relatively smaller combustion air admission holes may be interspersed in a common circumferential ring in the outboard liner. Alternatively, the first plurality of relatively larger combustion air admission holes may be arranged in a first circumferential ring and the first plurality of relatively smaller combustion air admission holes may be arranged in a second circumferential ring, the second circumferential ring being located forward of the first circumferential ring in the outboard liner.

In an aspect, a method is provided for operating the combustor including the step of distributing fuel between the plurality of main fuel injection and air swirler assemblies and the plurality of pilot fuel injection and air swirler assemblies in response to the level of power demand on the gas turbine engine. In accord with the method, at lower power demand, the fuel being supplied to the combustor is split relatively evenly between the plurality of main fuel injection and air swirler assemblies and the pilot fuel injection and air swirler assemblies. At moderate (mid-range) power demand, the fuel being supplied to the combustor is distributed predominately to the plurality of main fuel injection and air swirler assemblies. At higher power demand, a majority of the fuel being supplied to the combustor is distributed to the plurality of main fuel injection and air swirler assemblies.

BRIEF DESCRIPTION OF THE DRAWINGS

For a further understanding of the disclosure, reference will be made to the following detailed description which is to be read in connection with the accompanying drawing, wherein.

DETAILED DESCRIPTION OF THE INVENTION

Figure 1:
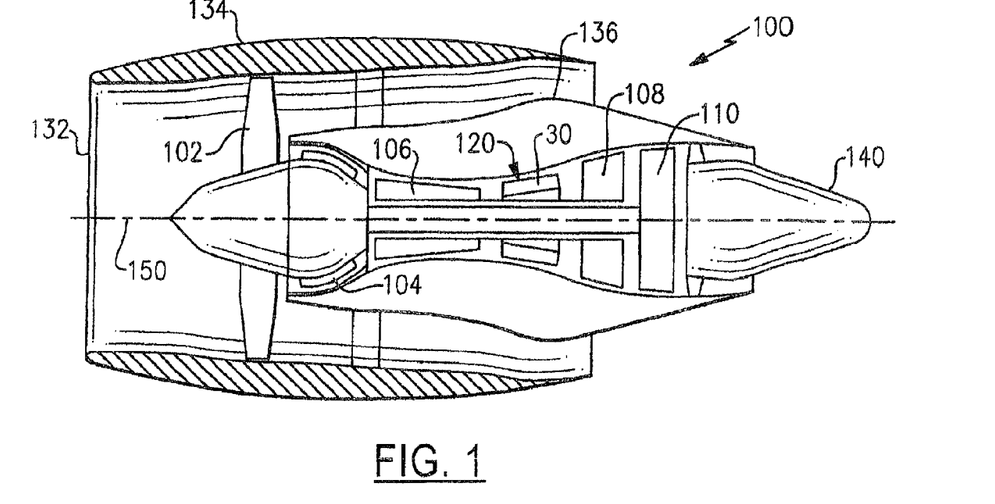
FIG. 1 is a schematic view of a longitudinal section of an exemplary embodiment of a turbofan gas turbine engine.

Referring now in FIG. 1, there is shown an exemplary embodiment of a turbofan gas turbine engine, designated generally as 100, that includes, from fore-to-aft longitudinally about a central engine axis 150, a fan 102, a low pressure compressor 104, a high pressure compressor 106, a combustor module 120, a high pressure turbine 108, and a low pressure turbine 110. A nacelle forms a housing or wrap that surrounds the gas turbine engine 100 to provide an aerodynamic housing about gas turbine engine. In the turbofan gas turbine engine 100 depicted in the drawings, the nacelle includes, from fore to aft, the engine inlet 132, the fan cowl 134, the engine core cowl 136 and the primary exhaust nozzle cone 140. It is to be understood that the combustor as disclosed herein is not limited in application to the depicted embodiment of a gas turbine engine, but is applicable to other types of gas turbine engines, including other types of aircraft gas turbine engines, as well as industrial and power generation gas turbine engines.

Figure 2:
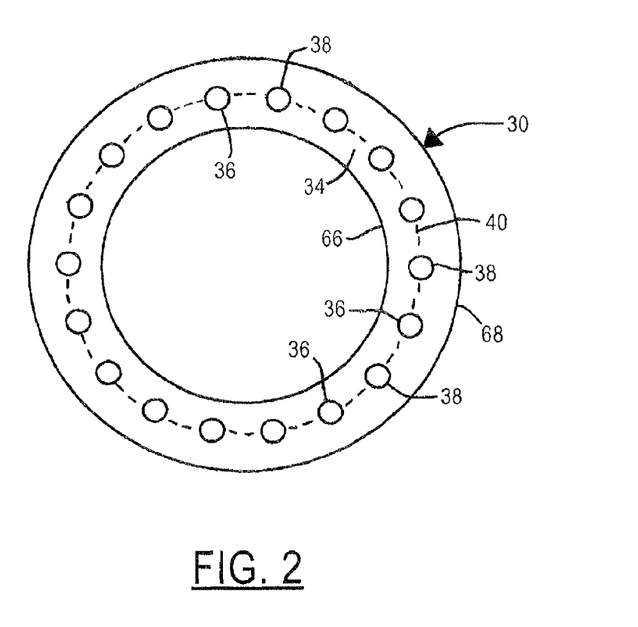
FIG. 2 is an elevation view of the forward bulkhead of the annular combustor disclosed herein showing an exemplary arrangement of the main fuel injection and air swirler assemblies and the pilot fuel injection and air swirler assemblies.
Figure 3:
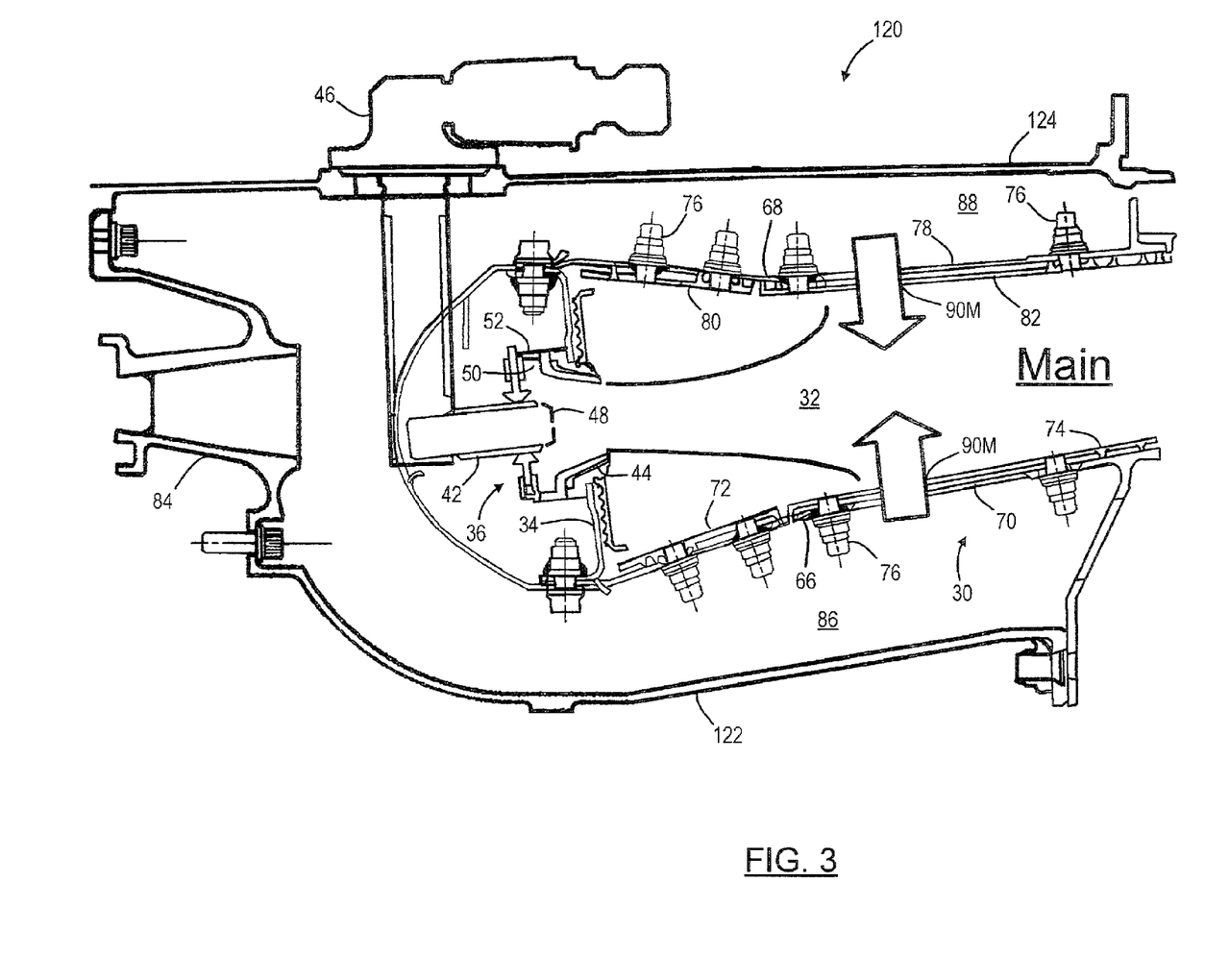
FIG. 3 is a sectioned side elevation view of an exemplary of the annular combustor disclosed herein showing a main fuel injection and air swirler assembly.
Figure 4:
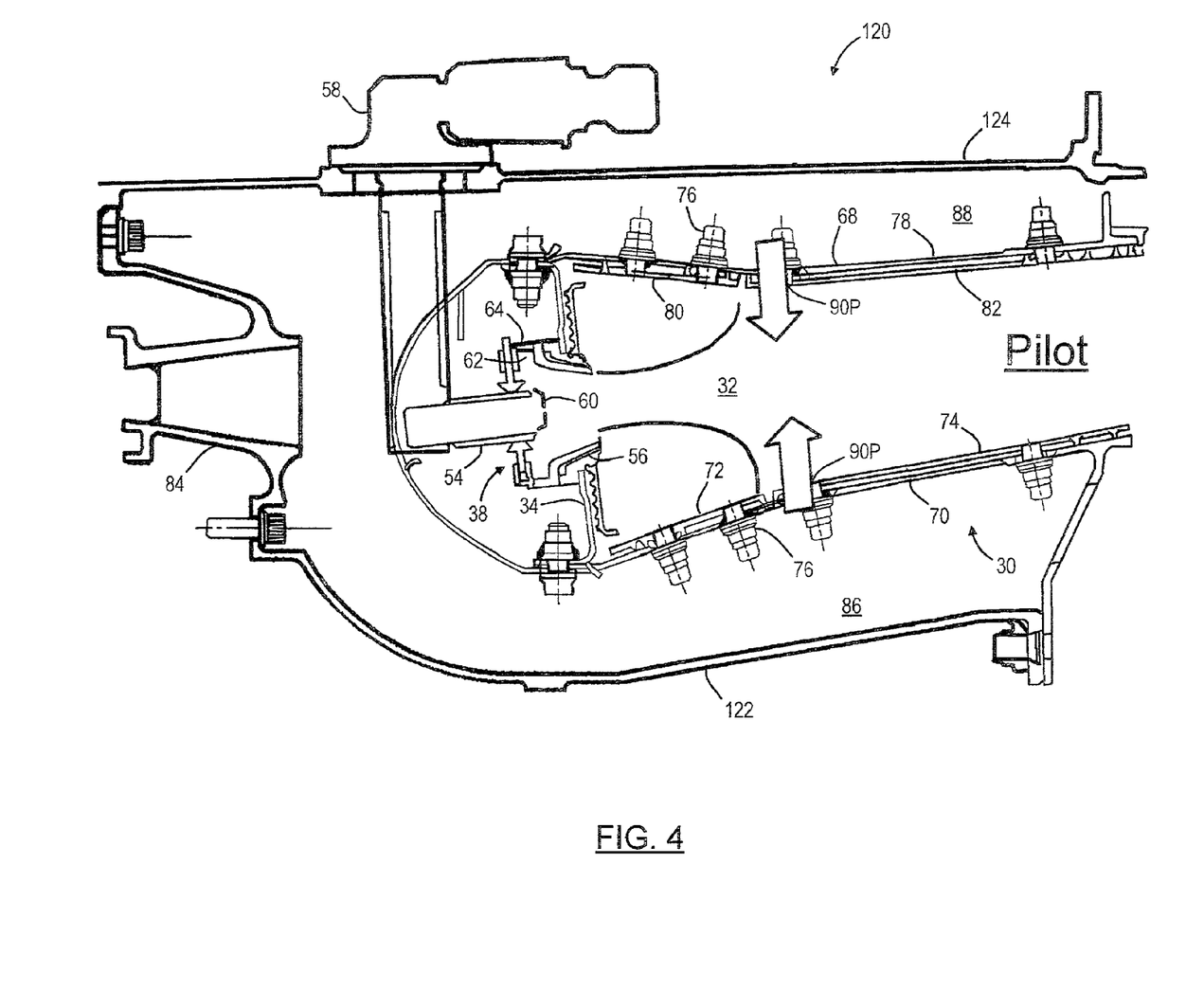
FIG. 4 is a sectioned side elevation view of an exemplary of the annular combustor disclosed herein showing a pilot fuel injection and air swirler assembly.

Referring now to FIG. 3, the combustor module 120 includes an annular combustor 30 disposed concentrically about the engine axis 150 (FIG. 1) within a pressure vessel defined by a radially inboard case 122 and a radially outboard case 124. Referring now to FIGS. 2-4, the annular combustor 30 has an annular combustor chamber 32 that extends axially fore to aft. A bulkhead 34 is disposed at a forward end of the annular combustion chamber 32. The bulkhead 34 has a radial expanse and a circumferential expanse. A plurality of main fuel injection and air swirler assemblies 36 and a plurality of pilot fuel injection and air swirler assemblies 38 open to the annular combustion chamber 32 through the bulkhead 34 for admitting fuel and air into the annular combustion chamber. The plurality of main fuel injection and air swirler assemblies 36 and the plurality of pilot fuel injection and air swirler assemblies 38 are disposed in a circumferential ring 40 extending about the circumferential expanse of the bulkhead 34. The pilot fuel injection and air swirler assemblies 38 are interspersed amongst the main fuel injection and air swirler assemblies 36.

In exemplary embodiment depicted in FIG. 2, the plurality of main fuel injection and air swirler assemblies 36 and the plurality of pilot fuel injection and air swirler assemblies 38 are disposed in alternating sequence in the circumferential ring 40, whereby a pilot fuel injection and air swirler assembly 38 is positioned between two main fuel injection and air swirler assemblies 36. In this embodiment, the number of pilot fuel injection and air admission assemblies 38 is equal to the number of main fuel injection and air admission assemblies 36. The sum of the number of main fuel injection and air admission assemblies 36 and the number of pilot fuel injection and air swirler assemblies 38 may total up to twice the number typical fuel injection and air admission assemblies in a conventional combustor for a given size, e.g. thrust output, of a gas turbine engine.

Referring now to FIG. 3 in particular, each main fuel injection and air swirler assembly 36 includes a fuel injection nozzle 42 and an associated air swirler 44. The fuel injection nozzle 42 has an inlet at its forward end in fuel flow communication with a first fuel manifold 46 and a spray head 48 at its aft end. The air swirler 44 is disposed about the aft end of the fuel injection nozzle 42 and includes one or more conical surfaces defining annular passages 50 through which pressurized air enters the combustion chamber 30 with a swirl being imparted to the air flow by swirl inducing devices, such as for example swirl vanes 52, disposed in the passages 50. Fuel passing through the fuel injection nozzle 42 from the first fuel manifold 46 is injected through the spray head 48 onto a radially inner conical surface of the air swirler 44 to form a fuel film which is sheared off the radially inner conical surface by and into the air flow passing into the combustion chamber 30 through the passages 50 of the air swirler 44.

Referring now to FIG. 4 in particular, each pilot fuel injection and air swirler assembly 38 includes a fuel injection nozzle 54 and an associated air swirler 56. The fuel injection nozzle 54 has an inlet at its forward end in fuel flow communication with a second fuel manifold 58 and a spray head 60 at its aft end. The air swirler 56 is disposed about the aft end of the fuel injection nozzle 54 and includes one or more annular passages 62 through which pressurized air enters the combustion chamber 32 with a swirl being imparted to the air flow by swirl inducing devices, such as for example swirl vanes 64, disposed in the passages 62. Fuel passing through the fuel injection nozzle 54 from the second fuel manifold 58 is injected through the spray head 60 into the air flow passing into the combustion chamber 32 through the passages 62 of the air swirler 56.

The air swirlers 56 of the plurality of pilot fuel injection and air swirler assemblies 38 are adapted to impart a relatively high level of swirl to air passing through the passages 62. The relatively high level of swirl is desired in connection with each of the pilot fuel injection and air swirler assemblies 38 to ensure a high degree of combustion stability and a relatively long residence time in the combustion zone at the forward regions of combustion chamber into which fuel is injected and air admitted through the pilot fuel injection and air swirler assembly 38. Conversely, the air swirlers 44 of the plurality of main fuel injection and air swirler assemblies 36 are adapted to impart a lower level of swirl to air passing through the passages 50 relative the higher level of swirl imparted by the air swirlers 56 of the plurality of pilot fuel injection and air swirler assemblies 38. The lower level of swirl is desired in connection with each of the main fuel injection and air swirler assemblies 36 to provide a relatively short residence time and less turbulent combustion zone at the forward regions of the combustion chamber into which fuel is injected and air admitted through the main fuel injection and air swirler assemblies 36. Igniters (not shown) for initiating light-off may be placed in operative association with at least one, and generally several of the higher swirl pilot fuel injection and air swirler assemblies 38 to ensure stable ignition.

The combustion chamber 32 of the annular combustor 30 is bounded by a radially inboard liner 66, a radially outboard liner 68, and the forward bulkhead 34 that extends between the respective forward end of the inboard liner 66 and the forward end of the outboard liner 68. The inboard liner 66 and the outboard liner 68 extend circumferentially about the longitudinal axis 150 of the gas turbine engine and extend longitudinally fore-to-aft from the forward bulkhead 34 to the combustor exit. The outboard liner 68 is spaced radially outward from and coaxially about the inboard liner 66 and circumscribes the inboard liner 66.

In the exemplary embodiment depicted in FIGS. 3 and 4, the inboard liner 66 and the outboard liner 68 have a double-wall structure with a support shell and associated heat shields. The inboard liner 66 comprises a single piece support shell 70 connected to the inboard case 122, and forward and aft inner heat shields 72, 74 secured by fasteners 76 to respective forward and aft portions of the support shell 70. Similarly, the outboard liner 68 comprises a single piece support shell 78 connected to the outboard case 124, and forward and aft inner heat shields 80, 82 secured by fasteners 76 to respective forward and aft portions of the support shell 78. The heat shields 72, 74, 80, 82 may be formed as a circumferential array of actuate panels. The inboard and outboard liner 66, 68 may have a plurality of cooling air holes (not shown), including, for example, impingement cooling holes and film cooling holes, penetrating through the support shell and heat shields as in conventional practice. Exemplary liner and heat shield constructions are described and shown in commonly assigned U.S. Pat. No. 7,093,439, the entire disclosure of which is hereby incorporated herein by reference as if set forth herein. Other embodiments, including single-wall liners, are still within the spirit and scope of the invention.

To facilitate operation of the annular combustor 30 in a rich burn-quick quench-lean burn (RQL) combustion mode for lowering NOx emissions, at least one of the inboard liner 66 and the outboard liner 68, and generally both of the inboard and outboard liners 66, 68, have a plurality of combustion air admission holes 90 penetrating therethrough and opening into the combustion chamber 32 for admitting additional air into a quench zone located downstream of the initial combustion zone. In operation, pressurized air from the compressor is decelerated as it passes through a diffuser section 84 connecting the outlet of the high pressure compressor 106 and is directed into the annular plenums 86, 88 defined within the annular pressure vessel, the annular plenum 86 extending circumferentially along and radially inwardly of the inboard liner 66 and the annular plenum 88 extending circumferentially about and radially outwardly of the outboard liner 68. A portion of this pressured air passes into the combustion chamber through the air swirlers 44, 56 that impart a spin to the air passing therethrough to provide rapid mixing of this air with the fuel being injected through the associated fuel injection nozzles 42, 54 to promote initial combustion of the fuel in a fuel-rich state in a forward portion of the combustion chamber 32. Additional air enters the forward region of the combustion chamber 32 by way of cooling holes (not shown) in the forward bulkhead 34 as bulkhead cooling air. Collectively, these portions of air admitted at the forward end of the combustion chamber 32 are referred to as primary combustion air because it intermixes to a great extent with fuel introduced through the fuel injection nozzles 42, 54 to support initial combustion in a fuel-rich state in the forward section of the combustion chamber.

In RQL combustion, the portion of the combustion air admitted to the combustion chamber as primary air is limited to an amount significantly less than the amount of air required for stoichiometric combustion of the fuel injected through the fuel injection nozzles 42, 54. Thus, combustion in the forward section of the combustion chamber occurs, on average, under fuel rich conditions, although local variability in terms of combustion stoichiometry is likely. The overall fuel-rich stoichiometry of the fuel-air mixture in this rich burn zone produces a relatively cool flame, thus reducing excessive NOx formation and guarding against blowout of the combustion flame during any abrupt reduction in engine power or low-power operation.

The combustion products from this rich burn zone, which include unburned fuel, progress downstream, that is aftward towards the exit of the combustion chamber 32, to pass through the aforementioned quench zone. In the quench zone, additional combustion air passes from the annular plenums 86, 88 through the aforementioned plurality of combustion air admission holes 90 to mix with and dilute the combustion products from their stoichiometrically rich state proximate to the forward edge of the quench zone to a stoichiometrically fuel lean state proximate to the aft edge of the quench zone. It is also important for this additional combustion air to penetrate into and intermix intimately with the combustion products flowing through the combustion chamber so that the fuel-air mixture quickly becomes both thoroughly blended.

Figure 5:
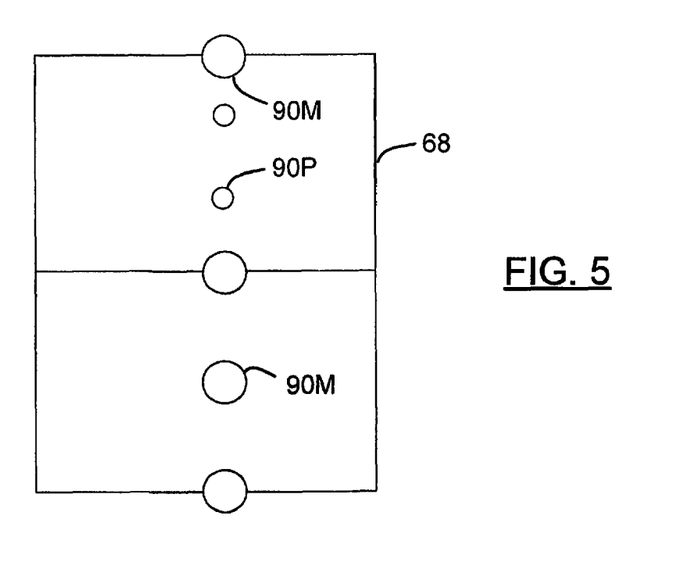
FIG. 5 is layout view of an embodiment of the air admission holes in the outboard liner of the annular combustor disclosed herein.
Figure 6:
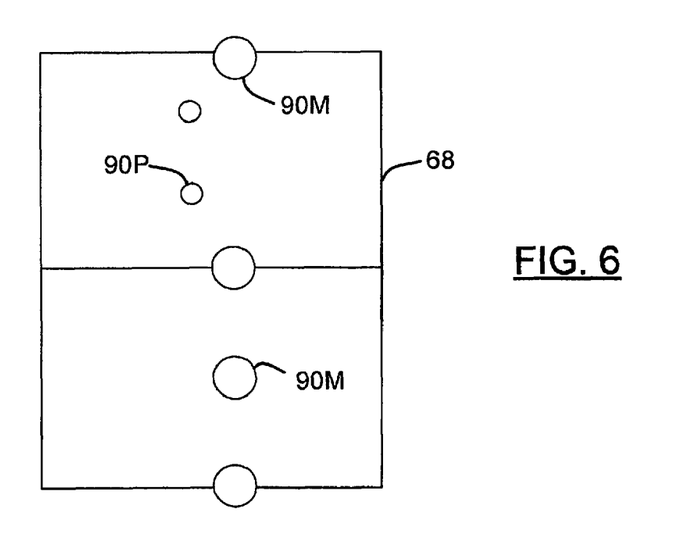
FIG. 6 is layout view of another embodiment of the air admission holes in the outboard liner of the annular combustor disclosed herein.

Referring now also to FIGS. 5-6, the plurality of combustion air admission holes 90 in each of the inboard and outboard liners 66, 68 includes a first plurality of relatively larger combustion air admission holes 90M arranged in a circumferential ring in association with the plurality of main fuel injection and air swirler assemblies 36 and a second plurality of relatively smaller combustion air admission holes 90P arranged in a circumferential ring in association with the plurality of pilot fuel injection and air swirler assemblies 38. The plurality of relatively larger combustion air admission holes 90M are disposed in multiple subsets of multiple holes grouped in each respective subset, for example 2 to 4 holes per subset, spaced circumferentially apart in a circumferential ring with each subset of relatively larger combustion air admission holes 90M positioned axially aftward of and circumferentially aligned with, i.e. in association with, a respective one of the plurality of main fuel injection and air swirler assemblies 36. Similarly, the plurality of relatively smaller combustion air admission holes 90P are disposed in multiple subsets of multiple holes grouped in each respective subset, for example 2 to 4 holes per subset, spaced circumferentially apart in a circumferential ring with each subset of relatively smaller combustion air admission holes 90P positioned axially aftward of and circumferentially aligned with, i.e. in association with, a respective one of the plurality of pilot fuel injection and air swirler assemblies 38.

In an embodiment of the combustor 30, the plurality of relatively larger combustion air admission holes 90M and the plurality of relatively smaller combustion air admission holes 90P are arranged in a common circumferential ring, as illustrated in FIG. 5, in alternating subsets. In this embodiment, the plurality of relatively larger combustion air admission holes 90M and the plurality of relatively smaller combustion air admission holes 90P are disposed in the same axial plane downstream of the bulkhead 34. However, in another embodiment of the combustor 30, plurality of relatively larger combustion air admission holes 90M and the plurality of relatively smaller combustion air admission holes 90P as disposed in separate circumferential rings spaced axially apart as illustrated in FIG. 6. In this embodiment, the plurality of relatively smaller combustion air admission holes 90P associated with the plurality of pilot fuel injection and air swirler assemblies 38 are arranged in a circumferential ring in an axial plane upstream, that is closer to the bulkhead 34, of the axial plane in which is disposed the circumferential ring of the plurality of relatively larger combustion air admission holes 90M associated with the plurality of main fuel injection and air swirler assemblies 36.

The axial location of the respective rings of the plurality of relatively larger combustion air admission holes 90M and of the plurality of relatively smaller combustion air admission holes 90P is selected to harmonize the competing considerations of optimizing the spatial temperature profile of the combustion products and preventing excessive NOx formation. The combustion air admission holes 90M, 90P should be positioned far enough forward to ensure that the air jets exiting therefrom have enough axial distance and ample time to adjust the temperature profile of the combustion products and achieve desired combustion efficiency before those gases exit the combustion chamber 32, but also far enough aft to prevent the dilution air from being entrained into the fuel-air mixture within the fuel-rich combustion zone forward of the quench zone. For example, as depicted in FIGS. 3 and 4, the combustion air admission holes 90M, 90P may be located in a forward region of the aft sections of the outboard liner 68 and inboard liner 66. Additionally, when a plurality of combustion holes 90M, 90P are provided in each of the outboard liner 68 and the inboard liner 66, the positioning of the holes 90M, 90P in the two liners 66, 68 should be coordinated so that the holes 90M, 90P in the inboard liner 66 are staggered circumferentially relative to their counterpart holes 90M, 90P in the outboard liner 68 to ensure that the respective air streams admitted through the inboard and outboard liners do not interfere with each other as they penetrate into the combustion products.

To achieve effective control of NOx emissions over the entire range of engine power operating modes from low power operation to high power operation, including idle, approach, cruise, climb and take-off, as well as limiting emissions of carbon monoxide, unburned hydrocarbons and smoke, particularly at low power engine operation, the combustor 32 may be operated with fuel scheduling according to the method disclosed herein. A fuel control associated with the electronic engine controller (not shown) is configured to selectively modulate fuel flow in response to engine power demand between the first (main) fuel manifold 46 supplying fuel to the main fuel injection and air swirler assemblies 36 and the second (pilot) fuel manifold 58 supplying fuel to the pilot fuel injection and air swirler assemblies 38.

Figure 7:
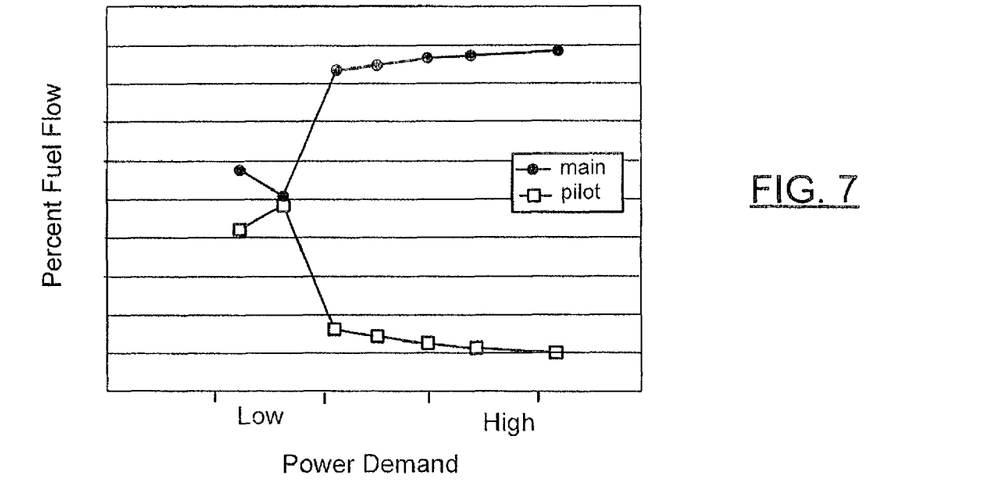
FIG. 7 is a graphical presentation of an exemplary fuel scheduling routine in accord with the method disclosed herein.
Figure 8:
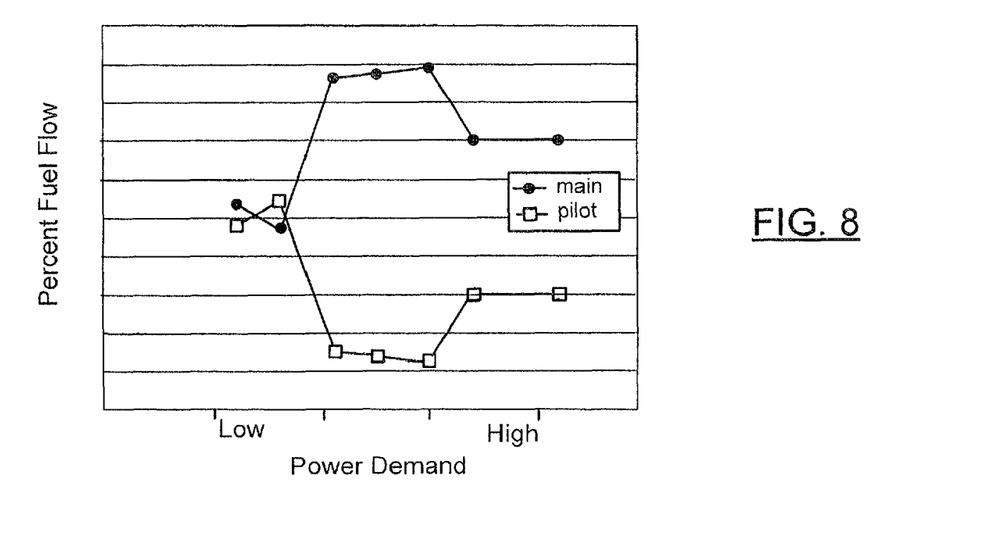
FIG. 8 is a graphical presentation of another exemplary fuel scheduling routine in accord with the method disclosed herein.

In accord with method, the fuel control directs the fuel being supplied at lower power demand operation, such during idle and approach, relatively equally between the first (main) fuel manifold 46 supplying fuel to the main fuel injection and air swirler assemblies 36 and the second (pilot) fuel manifold 58 supplying fuel to the pilot fuel injection and air swirler assemblies 38. For example, referring to the exemplary fuel scheduling routines illustrated in FIGS. 7 and 8, at low power demand on the engine, splits the fuel flow between the main fuel injection nozzles 42 and the pilot fuel injection nozzles 54 in ratios ranging from about 60/40 to about 45/55.

However, at moderate (mid-range) power demand on the engine, for example during operation at cruise, the fuel control directs the fuel being supplied predominately to the first (main) fuel manifold 46 supplying fuel to the main fuel injection and air swirler assemblies 36. For example, referring again to the exemplary fuel scheduling routines illustrated in FIGS. 7 and 8, at moderate power demand on the engine, the fuel control splits the fuel flow between the main fuel injection nozzles 42 and the pilot fuel injection nozzles 54 in ratios ranging from about 80/20 to about 90/10. Similarly, at higher power demand on the engine, such as during take-off and climb, the fuel control directs the majority of the fuel being supplied to the combustor 30 to the first (main) fuel manifold 46 supplying fuel to the main fuel injection and air swirler assemblies 36. For example, referring again to the exemplary fuel scheduling routines illustrated in FIGS. 7 and 8, at higher power demand on the engine, the fuel control splits the fuel flow between the main fuel injection nozzles 42 and the pilot fuel injection nozzles 54 in ratios ranging from about 70/30 to about 90/10.

Of course, it is to be understood that the amount of fuel being supplied to the combustor 30 varies with the power demand on engine. Thus, the fuel control supplies more fuel to the combustor 30 in response to the power demand of the engine, the least amount of fuel being supplied at idle and the greatest amount of fuel being supplied at take-off. Consequently, since the air flow to the combustor 32 is relatively constant in relation to power demand, the overall fuel to air ratio will varying proportionately to power demand. For purposes of illustration, but not limitation, the fuel to air ratio may, for example, range from about 0.015 at low power demand to about 0.03 at high power demand. However, despite the variation in overall fuel to air ratio, combustion generally remains fuel rich in the forward region of the combustion chamber 32 upstream of the combustion air admission holes 90M, 90P in the outboard liner 68 and inboard liner 66. Additionally, the fuel control proportions the fuel supplied between the main fuel injection and air swirler assemblies and the pilot fuel injection and air swirler assemblies in response to power demand in accord with the method presented herein whereby the combustion at the main fuel injection and air swirler assemblies 36 remains generally fuel-rich over the entire operating range of power demand on the gas turbine engine, and the pilot fuel injection and air swirler assemblies 38 ranges from near stoichiometric at low power to fuel-lean at high power. Due to the higher swirl associated with the pilot fuel injection and air swirler assemblies 38, combustion at the pilot fuel injection and air swirler assemblies remains stabilized over the entire operating range of power demand on the gas turbine engine and hot gas recirculation zones are established in the combustion chamber 32 which stabilize combustion at the adjacent main fuel injection and air swirler assemblies 36 over the entire operating range of power demand on the gas turbine engine.

The terminology used herein is for the purpose of description, not limitation. Specific structural and functional details disclosed herein are not to be interpreted as limiting, but merely as basis for teaching one skilled in the art to employ the present invention. Those skilled in the art will also recognize the equivalents that may be substituted for elements described with reference to the exemplary embodiments disclosed herein without departing from the scope of the present invention.

While the present invention has been particularly shown and described with reference to the exemplary embodiments as illustrated in the drawing, it will be recognized by those skilled in the art that various modifications may be made without departing from the spirit and scope of the invention. Therefore, it is intended that the present disclosure not be limited to the particular embodiment(s) disclosed as, but that the disclosure will include all embodiments falling within the scope of the appended claims.

I claim:

1. A combustor for a gas turbine engine having an annular combustion chamber, comprising:
    a bulkhead disposed at a forward end of the annular combustion chamber, the bulkhead having a radial expanse and a circumferential expanse;
    a plurality of main fuel injection and air swirler assemblies opening through the bulkhead for admitting fuel and air into the annular combustion chamber, the plurality of main fuel injection and air swirler assemblies disposed in a circumferential ring extending about the circumferential expanse of the bulkhead;
    a plurality of pilot fuel injection and air swirler assemblies opening through the bulkhead for admitting fuel and air into the annular combustion chamber, the plurality of pilot fuel injection and air swirler assemblies interspersed amongst and disposed in the circumferential ring of the plurality of main fuel injection and air swirler assemblies, the air swirlers of the plurality of main fuel injection and air swirler assemblies adapted to impart a lower level of swirl to air passing therethrough relative the air swirlers of the plurality of pilot fuel injection and air swirler assemblies, further comprising:
    an inboard liner extending longitudinally fore to aft from a radially inboard extent of the circumferential expanse of the bulkhead to a combustor exit;
    an outboard liner extending longitudinally fore to aft from a radially outboard extent of the circumferential expanse of the bulkhead to the combustor exit;
    a first plurality of relatively larger combustion air admission holes formed in the outboard liner, disposed in multiple subsets of multiple holes and each subset arranged in a first circumferential ring aftward of the bulkhead in association with the plurality of main fuel injection and air swirler assemblies, each subset including two holes; and
    a first plurality of relatively smaller combustion air admission holes formed in the outboard liner, disposed in multiple subsets of multiple holes and each subset arranged in a second circumferential ring aftward of the bulkhead in association with the plurality of pilot fuel injection and air swirler assemblies, each subset including two holes, and the second circumferential ring located forward of the first circumferential ring in the outboard liner.

2. The combustor for a gas turbine engine as recited in claim 1 wherein a second plurality of relatively larger combustion air admission holes are arranged in a third circumferential ring and a second plurality of relatively smaller combustion air admission holes are arranged in a fourth circumferential ring, the fourth circumferential ring being located forward of the third circumferential ring in the inboard liner.

3. The combustor for a gas turbine engine as recited in claim 1 wherein a second plurality of relatively larger combustion air admission holes and a second plurality of relatively smaller combustion air admission holes located in the inboard liner are staggered circumferentially relative to the first plurality of relatively larger combustion air admission holes and the first plurality of relatively smaller combustion air admission holes located in the outboard liner.

4. A method for operating a combustor of a gas turbine engine, comprising:
    providing a bulkhead disposed at a forward end of an annular combustion chamber the bulkhead having a radial expanse and a circumferential expanse;
    providing a plurality of main fuel injection and air swirler assemblies opening through the bulkhead for admitting fuel and air into the annular combustion chamber, the plurality of main fuel injection and air swirler assemblies disposed in a circumferential ring extending about the circumferential expanse of the bulkhead;
    providing a plurality of pilot fuel injection and air swirler assemblies opening through the bulkhead for admitting fuel and air into the annular combustion chamber, the plurality of pilot fuel injection and air swirler assemblies interspersed amongst and disposed in the circumferential ring of main fuel injection and air swirler assemblies, the air swirlers of the plurality of main fuel injection and air swirler assemblies adapted to impart a lower level of swirl to air passing therethrough relative the air swirlers of the plurality of pilot fuel injection and air swirler assemblies;
    providing an inboard liner extending longitudinally fore to aft from a radially inboard extent of the circumferential expanse of the bulkhead to a combustor exit;
    providing an outboard liner extending longitudinally fore to aft from a radially outboard extent of the circumferential expanse of the bulkhead to the combustor exit;
    providing a first plurality of relatively larger combustion air admission holes formed in the outboard liner, disposed in multiple subsets of multiple holes and each subset arranged in a first circumferential ring aftward of the bulkhead in association with the plurality of main fuel injection and air swirler assemblies, each subset including two holes;
    providing a first plurality of relatively smaller combustion air admission holes formed in the outboard liner, disposed in multiple subsets of multiple holes and each subset arranged in a second circumferential ring aftward of the bulkhead in association with the plurality of pilot fuel injection and air swirler assemblies, each subset including two holes, and the second circumferential ring located forward of the first circumferential ring in the outboard liner; and
    distributing fuel being supplied to the combustor between the plurality of main fuel injection and air swirler assemblies and the plurality of pilot fuel injection and air swirler assemblies in response to a level of power demand on the gas turbine engine.

5. The method as recited in claim 4 further comprising the step of at lower power demand distributing fuel being supplied to the combustor relatively evenly between the plurality of main fuel injection and air swirler assemblies and the plurality of pilot fuel injection and air swirler assemblies.

6. The method as recited in claim 4 further comprising the step of at moderate (mid-range) power demand distributing fuel being supplied to the combustor predominately to the plurality of main fuel injection and air swirler assemblies.

* * * * *